US011905685B2

(12) United States Patent
Hamada et al.

(10) Patent No.: US 11,905,685 B2
(45) Date of Patent: Feb. 20, 2024

(54) INDEX-VALUE DETERMINATION DEVICE AND INDEX-VALUE DETERMINATION METHOD

(71) Applicant: Komatsu Ltd., Tokyo (JP)

(72) Inventors: Shintaro Hamada, Tokyo (JP); Minami Sugimura, Tokyo (JP)

(73) Assignee: Komatsu Ltd., Tokyo (JP)

( * ) Notice: Subject to any disclaimer, the term of this patent is extended or adjusted under 35 U.S.C. 154(b) by 380 days.

(21) Appl. No.: 17/262,349

(22) PCT Filed: Mar. 12, 2019

(86) PCT No.: PCT/JP2019/010109

§ 371 (c)(1),
(2) Date: Jan. 22, 2021

(87) PCT Pub. No.: WO2020/026503

PCT Pub. Date: Feb. 6, 2020

(65) Prior Publication Data

US 2021/0292999 A1 Sep. 23, 2021

(30) Foreign Application Priority Data

Jul. 31, 2018 (JP) ................................ 2018-144089

(51) Int. Cl.
*E02F 9/26* (2006.01)
*G07C 5/08* (2006.01)
*G07C 5/12* (2006.01)

(52) U.S. Cl.
CPC .............. *E02F 9/26* (2013.01); *G07C 5/0825* (2013.01); *G07C 5/0841* (2013.01); *G07C 5/12* (2013.01)

(58) Field of Classification Search
CPC ........... E02F 9/2054; E02F 9/26; E02F 9/268; G07C 5/0825; G07C 5/0841; G07C 5/12
See application file for complete search history.

(56) References Cited

U.S. PATENT DOCUMENTS 8,024,095 B2 * 9/2011 Mintah .................. E02F 9/264 701/50
8,156,048 B2 * 4/2012 Mintah ................. E02F 9/2029 177/139
9,309,650 B2 * 4/2016 Nagato ..................... E02F 9/26
9,476,183 B2 * 10/2016 Nagato ................... E02F 9/267
2009/0228177 A1 * 9/2009 Mintah ..................... E02F 9/26 701/50

(Continued)

FOREIGN PATENT DOCUMENTS

CN 203981240 U 12/2014
CN 104736772 A 6/2015

(Continued)

*Primary Examiner* — Tyler J Lee
(74) *Attorney, Agent, or Firm* — Locke Lord LLP

(57) ABSTRACT

A state data acquisition unit acquires state data indicating a state of a work machine at a plurality of times. A work determination unit determines a classification of a work of the work machine for each of the plurality of times based on the acquired state data. A period determination unit determines a start point and an end point of a period related to a predetermined classification among determined classifications of works. An index-value determination unit obtains an index value of the state of the work machine from the start point to the end point.

21 Claims, 9 Drawing Sheets

(56) References Cited

U.S. PATENT DOCUMENTS

| | | | | |
|---|---|---|---|---|
| 2014/0067092 | A1* | 3/2014 | Cesur | G05B 15/02 700/83 |
| 2015/0292185 | A1 | 10/2015 | Nagato et al. | |
| 2016/0281323 | A1 | 9/2016 | Imaizumi | |
| 2017/0245444 | A1* | 8/2017 | Savuoja | G05B 15/02 |
| 2018/0051442 | A1* | 2/2018 | Igarashi | E02F 9/2025 |
| 2018/0137446 | A1* | 5/2018 | Shike | E02F 9/2054 |

FOREIGN PATENT DOCUMENTS

| | | | |
|---|---|---|---|
| JP | 2000-204606 | A | 7/2000 |
| JP | 2011-038346 | A | 2/2011 |
| JP | 2014-214566 | A | 11/2014 |
| JP | 2015-190114 | A | 11/2015 |
| WO | 2016/121243 | A1 | 8/2016 |

* cited by examiner

INDEX-VALUE DETERMINATION DEVICE AND INDEX-VALUE DETERMINATION METHOD

TECHNICAL FIELD

The present invention relates to an index-value determination device and an index-value determination method.

Priority is claimed on Japanese Patent Application No. 2018-144089, filed Jul. 31, 2018, the content of which is incorporated herein by reference.

BACKGROUND ART

A technology of collecting operation information on an operation of a work machine and estimating the work of the work machine is known. Patent Literature 1 discloses a technology of estimating the work content of a work machine based on a time change of a plurality of driving variables depending on an operating state of the work machine.

CITATION LIST

Patent Literature

[Patent Literature 1]
Japanese Unexamined Patent Application, First Publication No. 2014-214566

SUMMARY OF INVENTION

Technical Problem

By the way, evaluation material related to various viewpoints are required in order to determine and evaluate the skill of an operator and analyze work.

An object of the present invention is to provide an index-value determination device and an index-value determination method capable of obtaining an index value representing the state of a work machine in a given situation.

Solution to Problem

According to a first aspect of the present invention, an index-value determination device includes: a state data acquisition unit that acquires state data indicating a state of a work machine at a plurality of times; a work determination unit that determines a classification of a work of the work machine for each of the plurality of times based on the acquired state data; a period determination unit that determines a start point and an end point of a period related to a predetermined classification among determined classifications of works; and an index-value determination unit that obtains an index value of the state of the work machine from the start point to the end point.

Advantageous Effects of Invention

According to at least one of the above aspects, the index-value determination device can generate evaluation material which can be used for evaluating an operator or analyzing work.

DESCRIPTION OF EMBODIMENTS

<<Overall Configuration>>

Figure 1:
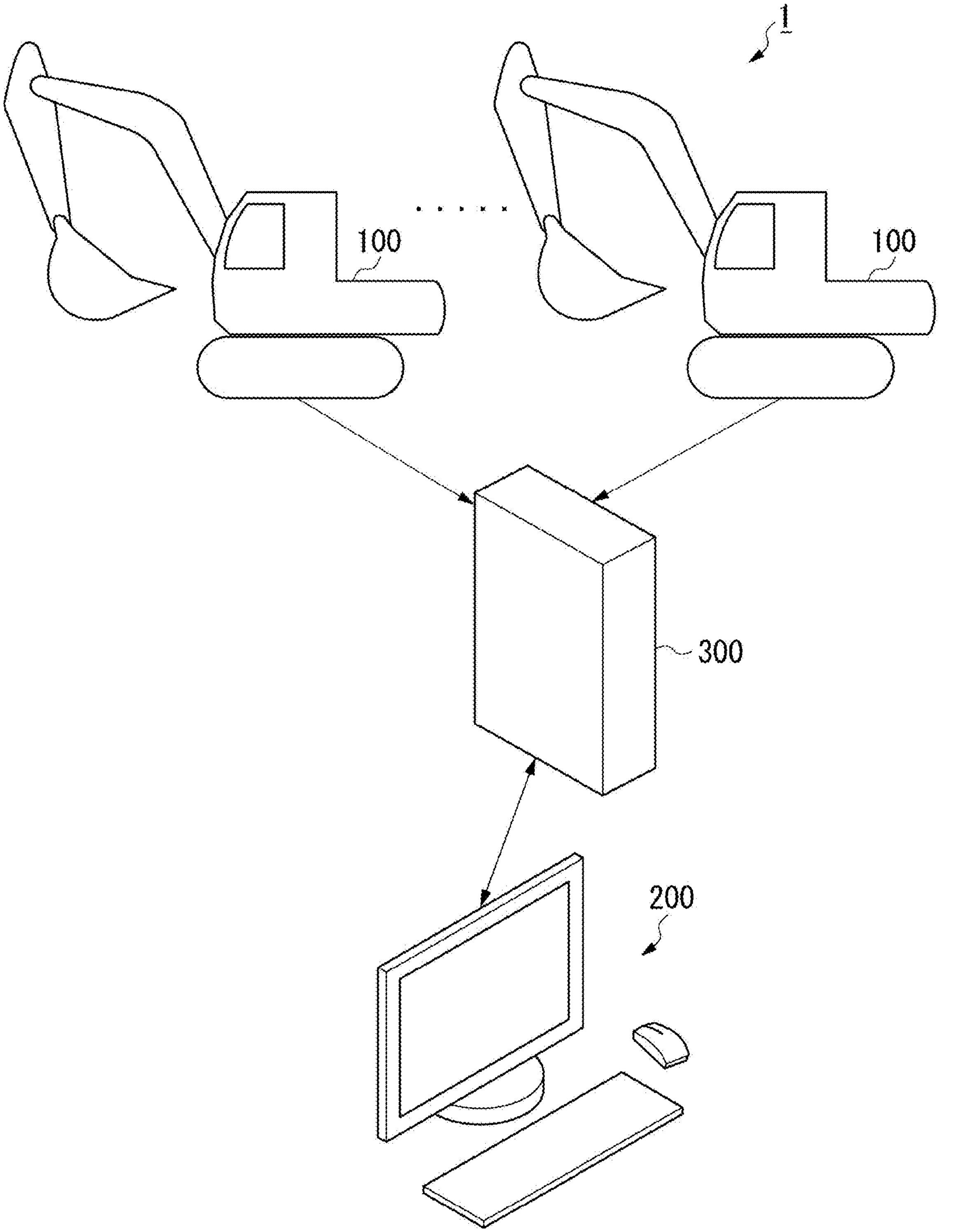
FIG. 1 is a schematic view illustrating a configuration of a work analysis system according to an embodiment.

FIG. 1 is a schematic view illustrating a configuration of a work analysis system according to an embodiment.

A work analysis system 1 includes a work machine 100, a labeling device 200, and a work analysis device 300. The work analysis device 300 is an example of an index-value determination device.

The work machine 100 is a target of work analysis by the work analysis device 300. Examples of the work machine 100 include a hydraulic excavator, a wheel loader, and the like. In the first embodiment, the hydraulic excavator will be described as an example of the work machine 100. The work machine 100 is provided with a plurality of sensors and an imaging device, and information and moving images related to a measurement value of each sensor are transmitted to the work analysis device 300.

The labeling device 200 generates label data in which the moving image stored in the work analysis device 300 is labeled with a label indicating work classification of the work machine 100 at that time.

The work analysis device 300 outputs a picture for displaying parameters related to the work classification of the work machine 100 in accordance with a model learned based on information received from the work machine 100 and the label data received from the labeling device 200. By recognizing the parameters output by the work analysis device 300, a user can evaluate an operator or analyze the work.

<<Hydraulic Excavator>>

Figure 2:
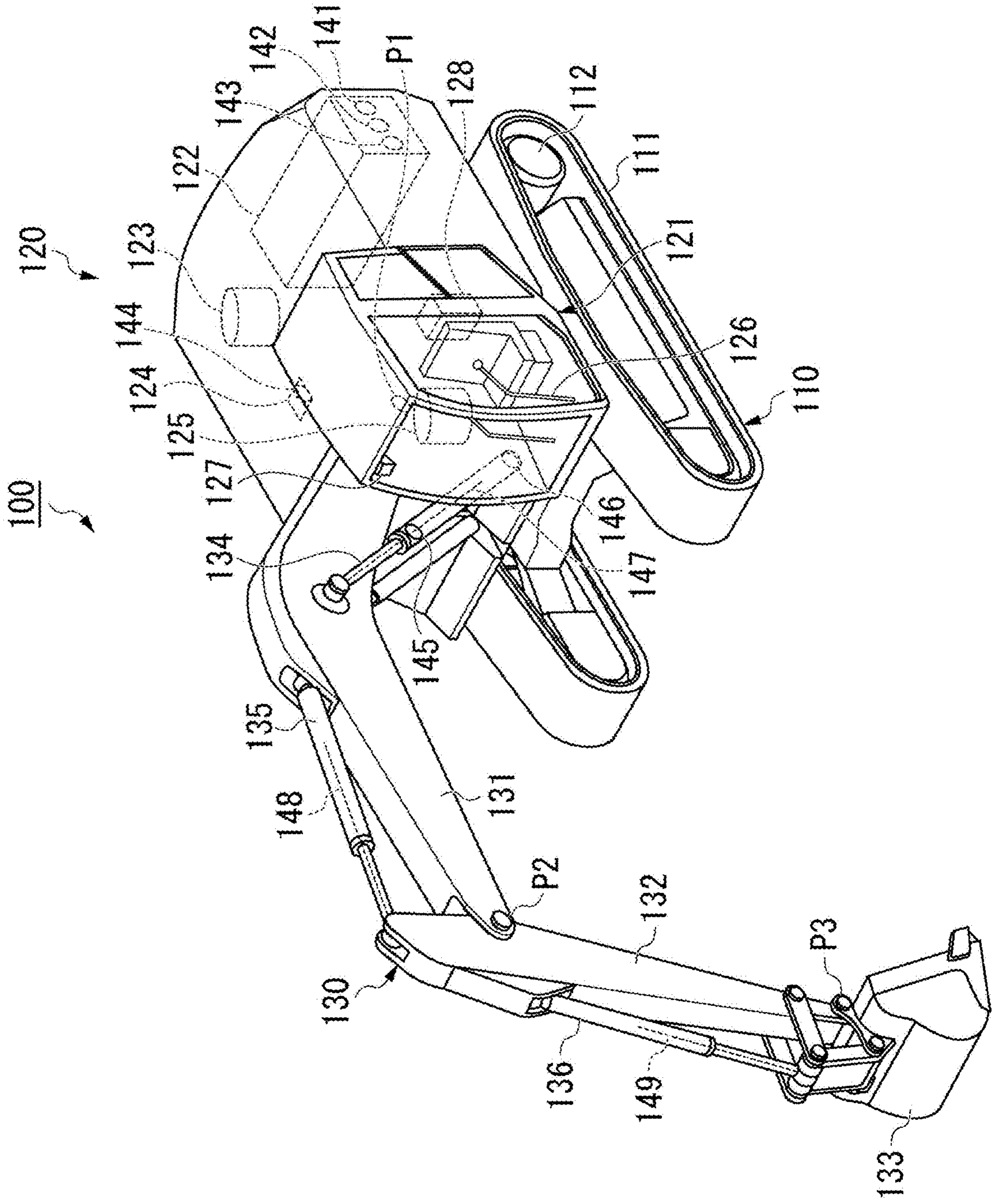
FIG. 2 is a perspective view illustrating a configuration of a hydraulic excavator according to the first embodiment.

FIG. 2 is a perspective view illustrating a configuration of a hydraulic excavator according to the first embodiment.

The work machine 100 includes a traveling body 110, a swing body 120 supported by the traveling body 110, and work equipment 130 which is operated by hydraulic pressure and is supported by the swing body 120. The swing body 120 is supported by the traveling body 110 to be freely swingable around a center of swing.

The traveling body 110 includes continuous tracks 111 provided on the left and right sides, and two traveling motors 112 for driving each continuous track 111.

The work equipment 130 includes a boom 131, an arm 132, a bucket 133, a boom cylinder 134, an arm cylinder 135, and a bucket cylinder 136.

A base end portion of the boom 131 is attached to the swing body 120 via a boom pin P1.

The arm 132 connects the boom 131 and the bucket 133. A base end portion of the arm 132 is attached to a tip end portion of the boom 131 via an arm pin P2.

The bucket 133 includes teeth for excavating earth, sand and the like, and an accommodating portion for accommodating the excavated earth and sand. A base end portion of the bucket 133 is attached to a tip end portion of the arm 132 via a bucket pin P3. For example, the bucket 133 may be a bucket for the purpose of leveling, such as a slope bucket, or may be a bucket which is not provided with an accommodating portion. Further, instead of the bucket 133, the work equipment 130 may be provided with other attachments such as a breaker for applying a crushing force by impacting or a grapple for holding an object.

The boom cylinder 134 is a hydraulic cylinder for operating the boom 131. A base end portion of the boom cylinder 134 is attached to the swing body 120. A tip end portion of the boom cylinder 134 is attached to the boom 131.

The arm cylinder 135 is a hydraulic cylinder for driving the arm 132. A base end portion of the arm cylinder 135 is attached to the boom 131. A tip end portion of the arm cylinder 135 is attached to the arm 132.

The bucket cylinder 136 is a hydraulic cylinder for driving the bucket 133. A base end portion of the bucket cylinder 136 is attached to the arm 132. A tip end portion of the bucket cylinder 136 is attached to the bucket 133.

The swing body 120 is provided with a cab 121 on which an operator rides. The cab 121 is provided in front of the swing body 120 and on the left side of the work equipment 130.

The swing body 120 includes an engine 122, a hydraulic pump 123, a control valve 124, a swing motor 125, an operation device 126, an imaging device 127, and a data aggregation device 128. In another embodiment, the work machine 100 may be operated by remote control via a network or by automatic driving. In this case, the work machine 100 may not include the cab 121 and the operation device 126.

The engine 122 is a prime mover which drives the hydraulic pump 123.

The hydraulic pump 123 is driven by the engine 122 and supplies hydraulic oil to each actuator (the boom cylinder 134, the arm cylinder 135, the bucket cylinder 136, the traveling motor 112, and the swing motor 125) via the control valve 124.

The control valve 124 controls a flow rate of the hydraulic oil supplied from the hydraulic pump 123.

The swing motor 125 is driven by the hydraulic oil supplied from the hydraulic pump 123 via the control valve 124 to swing the swing body 120.

The operation device 126 is two levers provided inside the cab 121. The operation device 126 receives commands of operations of raising and lowering the boom 131, pushing and pulling the arm 132, excavating and dumping with the bucket 133, swinging the swing body 120 to the right and left, and turning the traveling body 110 forward and backward. Specifically, the forward operation of the right operation lever corresponds to the command of the operation of lowering the boom 131. The backward operation of the right operation lever corresponds to the command of the operation of raising the boom 131. The rightward operation of the right operation lever corresponds to the command of the operation of dumping with the bucket 133. The leftward operation of the right operation lever corresponds to the command of the operation of excavating with the bucket 133. The forward operation of the left operation lever corresponds to the command of the operation of pulling the arm 132. The backward operation of the left operation lever corresponds to the command of the operation of pushing the arm 132. The rightward operation of the left operation lever corresponds to the command of the operation of swinging the swing body 120 to the right. The leftward operation of the left operation lever corresponds to the command of the operation of swinging the swing body 120 to the left.

An opening degree of a flow path connected to each actuator of the control valve 124 is controlled according to inclination of the operation device 126. The operation device 126 has, for example, a valve which changes a flow rate of pilot hydraulic oil according to the inclination of the operation device 126, and the pilot hydraulic oil operates a spool of the control valve 124 to control the opening degree of the control valve 124.

The imaging device 127 is provided in an upper portion of the cab 121. The imaging device 127 images a moving image in which the work equipment 130 is captured, which is an image in front of the cab 121. The moving image captured by the imaging device 127 is stored in the data aggregation device 128 together with time stamps.

The data aggregation device 128 collects detection values from the plurality of sensors included in the work machine 100 and stores the detection values in association with time stamps. Further, the data aggregation device 128 transmits a time series of the detection values collected from the plurality of sensors and the moving image captured by the imaging device 127 to the work analysis device 300. The detection value and the moving image of the sensor are examples of state data indicating a state of the work machine 100. The data aggregation device 128 is a computer including a processor (not illustrated), a main memory (not illustrated), a storage (not illustrated), and an interface (not illustrated). The storage of the data aggregation device 128 stores a data aggregation program. The processor of the data aggregation device 128 reads the data aggregation program from the storage, expands the data aggregation program to the main memory, and executes a collection process and a transmission process of the detection value and the moving image according to the data aggregation program. The data aggregation device 128 may be provided inside or outside the work machine 100.

The work machine 100 includes the plurality of sensors. Each sensor outputs a measurement value to the data aggregation device 128. Specifically, the work machine 100 includes a rotation speed sensor 141, a torque sensor 142, a fuel sensor 143, a pilot pressure sensor 144, a boom cylinder head pressure sensor 145, a boom cylinder bottom pressure sensor 146, a boom stroke sensor 147, an arm stroke sensor 148, and a bucket stroke sensor 149.

The rotation speed sensor 141 is provided in the engine 122 and measures a rotation speed of the engine 122.

The torque sensor 142 is provided in the engine 122 and measures torque of the engine 122.

The fuel sensor 143 is provided in the engine 122 and measures a fuel consumption amount (instantaneous fuel consumption) of the engine.

The pilot pressure sensor 144 is provided in the control valve 124 and measures a pressure (a PPC pressure) of each pilot hydraulic oil from the operation device 126. Specifically, the pilot pressure sensor 144 measures a PPC pressure related to the raising operation of the boom 131 (a boom raising PPC pressure), a PPC pressure related to the lowering operation of the boom 131 (a boom lowering PPC pressure), a PPC pressure related to the pushing operation of the arm 132 (an arm push PPC pressure), a PPC pressure related to the pulling operation of the arm 132 (an arm pull PPC pressure), a PPC pressure related to the excavation operation with the bucket 133 (a bucket excavation PPC pressure), a PPC pressure related to the dumping operation with the bucket 133 (a bucket dumping PPC pressure), a PPC pressure related to the right swinging operation of the swing body 120 (a right swing PPC pressure), a PPC pressure related to the left swinging operation of the swing body 120 (a left swing PPC pressure), a PPC pressure related to the forward operation of the left continuous track 111 (a left forward PPC pressure), a PPC pressure related to the backward operation of the left continuous track 111 (a left backward PPC pressure), a PPC pressure related to the forward operation of the right continuous track 111 (a right forward PPC pressure), and a PPC pressure related to the backward operation of the right continuous track 111 (a right backward PPC pressure). In another embodiment, instead of the pilot pressure sensor 144, a detector which detects an operation signal output by the operation device 126 may be provided.

The boom cylinder head pressure sensor 145 measures a pressure in an oil chamber on the head side of the boom cylinder 134.

The boom cylinder bottom pressure sensor 146 measures a pressure in an oil chamber on the bottom side of the boom cylinder 134.

The boom stroke sensor 147 measures a stroke amount of the boom cylinder 134.

The arm stroke sensor 148 measures a stroke amount of the arm cylinder 135.

The bucket stroke sensor 149 measures a stroke amount of the bucket cylinder 136. In another embodiment, instead of each stroke sensor, an angle meter which directly measures an angle of the work equipment 130 may be provided, or an inclinometer or an IMU may be provided for each of the boom 131, the arm 132, and the bucket 133. Further, in another embodiment, the angle of the work equipment 130 may be calculated from an image of the work equipment 130 captured by the imaging device 127.

The data aggregation device 128 may determine other state data of the work machine 100 based on a measurement value of each sensor. For example, the data aggregation device 128 may calculate an actual weight of the work equipment 130 based on a measurement value of the boom cylinder bottom pressure sensor 146. Further, for example, the data aggregation device 128 may calculate a lifting height of the work equipment 130 based on the boom stroke sensor 147, the arm stroke sensor 148, and the bucket stroke sensor 149.

<<Configuration of Labeling Device>>

Figure 3:
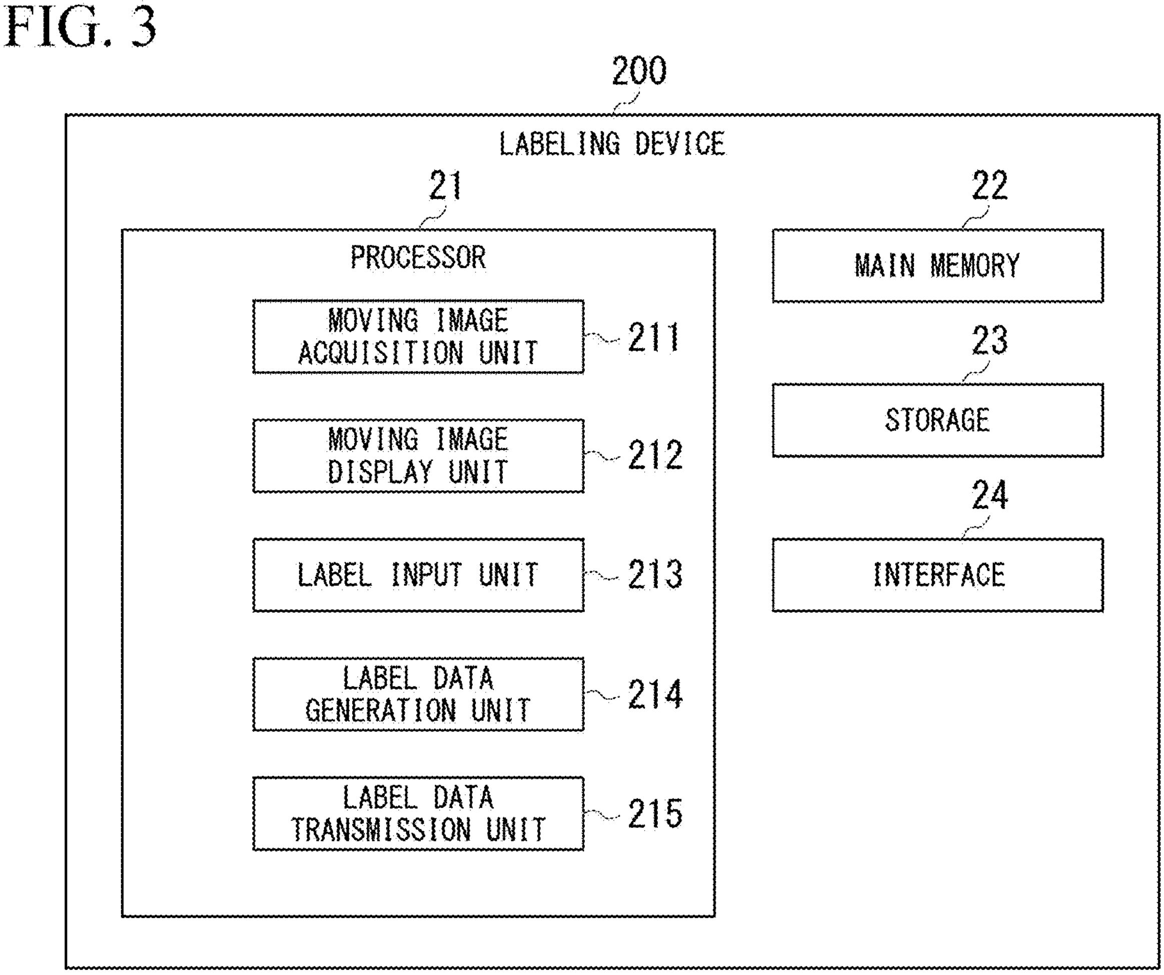
FIG. 3 is a schematic block diagram illustrating a configuration of a labeling device according to the first embodiment.

FIG. 3 is a schematic block diagram illustrating a configuration of a labeling device according to the first embodiment.

The labeling device 200 is a computer including a processor 21, a main memory 22, a storage 23, and an interface 24. Examples of the labeling device 200 include PCs, smartphones, tablet terminals, and the like. The labeling device 200 may be installed anywhere. That is, the labeling device 200 may be mounted on the work machine 100, may be mounted on the work analysis device 300, or may be provided separately from the work machine 100 and the work analysis device 300. The storage 23 stores a labeling program. The processor 21 reads the labeling program from the storage 23, expands the labeling program into a main memory 33 and executes a process according to the labeling program.

Examples of the storage 23 include a semiconductor memory, a disk media, a tape media, and the like. The storage 23 may be an internal medium directly connected to a common communication line of the labeling device 200, or an external medium connected to the labeling device 200 via the interface 24. The storage 23 is a non-transitory tangible storage medium.

The processor 21 includes a moving image acquisition unit 211, a moving image display unit 212, a label input unit 213, a label data generation unit 214, and a label data transmission unit 215 by executing the labeling program.

The labeling program may be a program for realizing a part of a function exerted by the labeling device 200. For example, the labeling program may be a program which exerts the function in combination with another program already stored in the storage 23, or in combination with another program mounted on another device. In another embodiment, the labeling device 200 may include a custom large scale integrated circuit (LSI) such as a programmable logic device (PLD) in addition to or in place of the above configuration. Examples of the PLD include a programmable array logic (PAL), a generic array logic (GAL), a complex programmable logic device (CPLD), and a field programmable gate array (FPGA). In this case, some or all of the functions implemented by the processor may be implemented by the integrated circuit.

The moving image acquisition unit 211 receives a moving image from the work analysis device 300. Each frame image of the moving image is associated with a time stamp indicating an imaging time.

The moving image display unit 212 displays the moving image acquired by the moving image acquisition unit 211 on a display.

The label input unit 213 receives an input of a label value indicating a classification of a work being executed by the work machine 100 at a playback timing, from a user, during playback of the moving image.

The label data generation unit 214 generates label data in which the label values input to the label input unit 213 are associated with time stamps indicating the input playback timing. The label data may be, for example, a matrix in which the classification of the work is a row and the time is a column and has a value as an element indicating whether or not the work related to the classification is performed at that time. In other words, the label data may be a matrix in which a value $w_{ij}$ of an element in an i-th column and an j-th row is set to 1 when a work related to a classification $a_j$ at a time $t_i$ is performed, and is set to 0 when the work related to the classification as at the time $t_i$ is not performed.

The label data transmission unit 215 transmits the label data to the work analysis device 300.

<<Example of Classification of Work>>

An example of a classification of a work input to the label input unit 213 will be described.

The label input unit 213 receives an input of a label value related to a unit work and a label value related to an element work, from the user. The unit work is work for accomplishing one work purpose. The element work is an element which constitutes a unit work and is a work indicating a series of operations or works which are classified by purpose.

Examples of classifications of the element works include "excavation", "load swing", "dumping", "empty load swing", "waiting for dumping", "load platform pressing", "rolling compaction", "pushing and smoothing", and "brooming".

"Excavation" means a work including digging and scraping earth, sand or rock with the bucket 133.

"Load swing" means a work including swinging the swing body 120 while holding the scraped earth, sand or rock in the bucket 133.

"Dumping" means a work including putting the scraped earth, sand or rock down from the bucket 133 to a transport vehicle or a predetermined location.

"Empty load swing" means a work including swinging the swing body 120 in a state in which no earth, sand and rock in the bucket 133.

"Waiting for dumping" means a work including waiting for the transport vehicle for loading while holding the scraped earth, sand or rock in the bucket 133.

"Load platform pressing" means a work including flatly pressing down upon the earth and sand loaded on a loading platform of the transport vehicle from above with the bucket 133.

"Rolling compaction" means a work including pushing the earth and sand into the turbulent ground with a bucket 133 to form or strengthen the ground.

"Pushing and smoothing" means a work including sweeping and smoothing out the earth and sand with a bottom surface of the bucket 133.

"Brooming" means a work including sweeping and smoothing the earth and sand with a side surface of the bucket 133. The "brooming" is a work which puts a load on the work equipment 130, but a deprecated work that puts a load on the work equipment can be determined by a work determination method to be described below.

Examples of classifications of the unit works include "excavating and loading", "ditching", "backfilling", "scraping", "sloping (from above)", "sloping (from below)", "load collection", "traveling", and "stopping".

"Excavating and loading" means a work including digging, scraping, and loading earth, sand or rock onto the loading platform of the transport vehicle. "Excavating and loading" is a unit work consisting of "excavation", "load swing", "dumping", "empty load swing", "waiting for dumping", and "load platform pressing".

"Ditching" means a work including digging and scraping the ground in a long and narrow groove shape. "Ditching" is a unit work consisting of "excavation", "load swing", "dumping", and "empty load swing", and can include "pushing and smoothing".

"Backfilling" means a work including putting earth and sand into a groove or a hole which is already open in the ground and backfilling the groove or the hole flat. Backfilling is a unit work consisting of "excavation", "load swing", "dumping", "rolling compaction", and "empty load swing", and can include "pushing and smoothing" and "brooming".

"Scraping" means a work including flattening excess undulations of the ground to a predetermined height. "Scraping" is a unit work consisting of "excavation" and "dumping", or "excavation", "load swing", "dumping", and "empty load swing", and can include "pushing and smoothing" and "brooming".

"Sloping (from above)" means a work including generating a slope with the work machine 100 located above a target location. "Sloping (from above)" is a unit work consisting of "rolling compaction", "excavation", "load swing", "dumping", and "empty load swing", and can include "pushing and smoothing".

"Sloping (from below)" means a work including generating a slope with the work machine 100 located below the target location. "Sloping (from below)" is a unit work consisting of "rolling compaction", "excavation", "load swing", "dumping", and "empty load swing", and can include "pushing and smoothing".

"Load collection" means a work including collecting earth and sand generated by excavation or the like before loading the earth and sand on the transport vehicle. "Load collection" is a unit work consisting of "excavation", "load swing", "dumping", and "empty load swing", and can include "pushing and smoothing".

"Traveling" means a work including moving the work machine 100. "Traveling" as a unit work is a unit work consisting of "traveling" as an element work.

"Stopping" is a state in which the bucket 133 has no earth, sand and rock and is stopped for a predetermined time or longer. "Stopping" as a unit work is a unit work consisting of "stopping" as an element work.

In addition, "excavating and loading", "ditching", "backfilling", "scraping", "sloping (from above)", and "sloping (from below)" are main works which are works contributing to a direct purpose of working. "Load collection" and "traveling" are incidental works which are works necessary to perform the main work.

<<Configuration of Work Analysis Device>>

Figure 4:
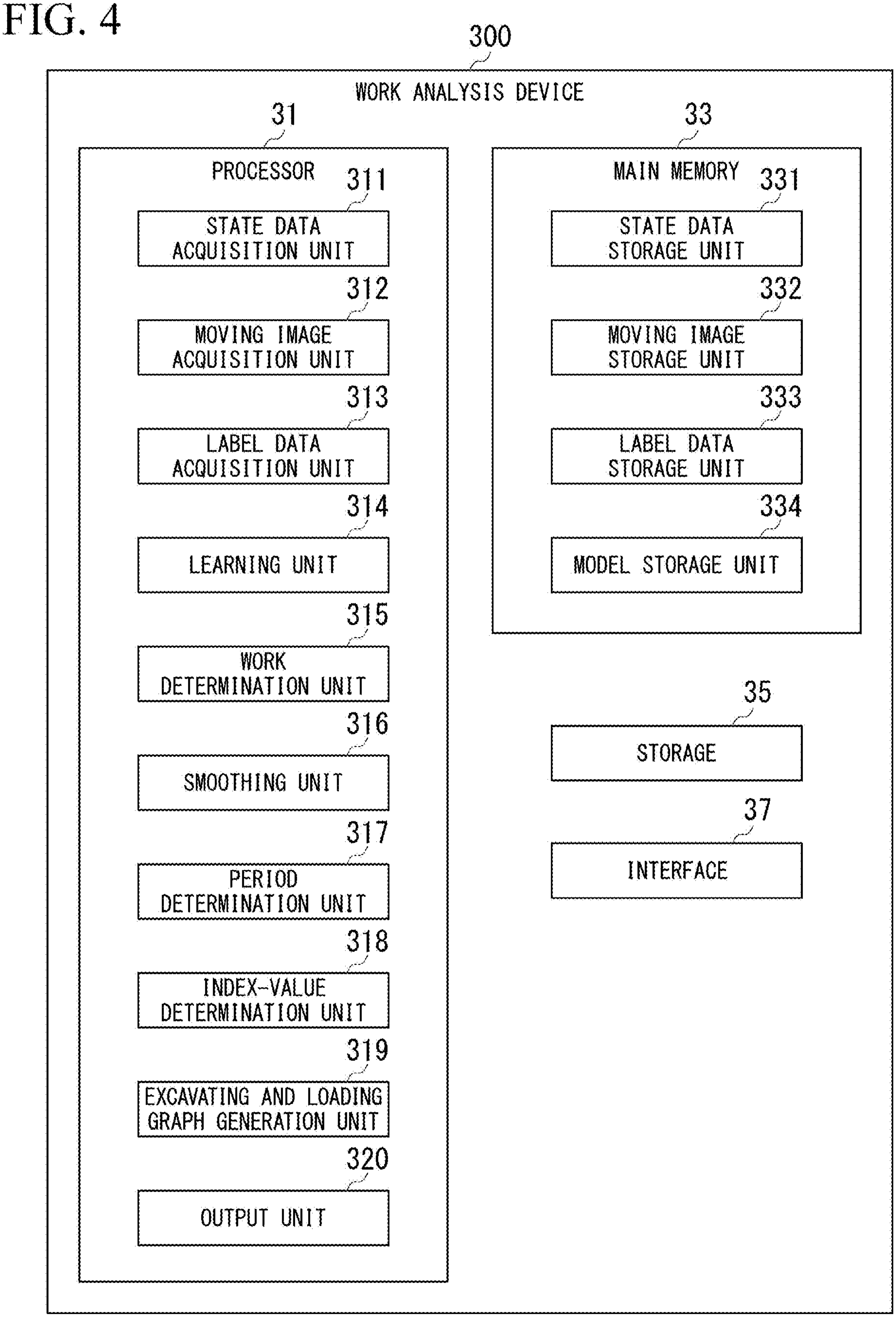
FIG. 4 is a schematic block diagram illustrating a configuration of a work analysis device according to the first embodiment.

FIG. 4 is a schematic block diagram illustrating a configuration of a work analysis device according to the first embodiment.

The work analysis device 300 is a computer including a processor 31, the main memory 33, a storage 35, and an interface 37. The storage 35 stores a work analysis program. The processor 31 reads the work analysis program from the storage 35, expands the work analysis program into the main memory 33, and executes a process according to the work analysis program. The work analysis device 300 according to the first embodiment is provided outside the work machine 100, but in another embodiment, a part or all of functions of the work analysis device 300 may be provided inside the work machine 100.

Examples of the storage 35 include a semiconductor memory, a disk media, a tape media, and the like. The storage 35 may be an internal medium directly connected to a common communication line of the work analysis device 300, or an external medium connected to the work analysis device 300 via the interface 37. The storage 35 is a non-transitory tangible storage medium.

By executing the work analysis program, the processor 31 includes a state data acquisition unit 311, a moving image acquisition unit 312, a label data acquisition unit 313, a learning unit 314, a work determination unit 315, a smoothing unit 316, a period determination unit 317, and an index-value determination unit 318, an excavating and loading graph generation unit 319, and an output unit 320. Further, the processor 31 secures storage areas of a state data storage unit 331, a moving image storage unit 332, a label data storage unit 333, and a model storage unit 334 in the main memory 33, by executing the work analysis program.

The work analysis program may be a program for realizing a part of the functions exerted by the work analysis device 300. For example, the work analysis program may be a program which exerts the function in combination with another program already stored in the storage 35, or in combination with another program mounted on another device. In another embodiment, the work analysis device 300 may include a custom LSI such as a PLD in addition to or in place of the above configuration. Examples of the PLD include a PAL, a GAL, a CPLD, and an FPGA. In this case, some or all of the functions implemented by the processor may be implemented by the integrated circuit.

The state data acquisition unit 311 acquires a time series of state data indicating a state of the work machine 100 from the data aggregation device 128 of the work machine 100. That is, the state data acquisition unit 311 acquires a plurality of combinations of time stamps and the state data. The state data may include a measurement value of each sensor of the work machine 100 and a value obtained by the data aggregation device 128 based on the measurement value. The state data acquisition unit 311 stores the acquired time series of the state data in the state data storage unit 331 in association with an ID of the work machine 100.

The moving image acquisition unit 312 acquires a moving image captured by the imaging device 127 from the data aggregation device 128 of the work machine 100. The moving image acquisition unit 312 stores the acquired moving image in the moving image storage unit 332 in association with the ID of the work machine 100.

The label data acquisition unit 313 acquires label data of the unit work and label data of the element work from the labeling device 200. In a case where a frame cycle of the imaging device 127 and a detection cycle of each sensor are different from each other, the label data acquisition unit 313 matches a time stamp of the label data with a time stamp of the state data. For example, the label data acquisition unit 313 reconstructs a time series of the label data such that the time stamp of the label data coincides with the time stamp of the state data. The label data acquisition unit 313 stores the time series of the acquired label data in the label data storage unit 333 in association with the ID of the work machine 100. That is, the label data acquisition unit 313 stores a plurality of combinations of the time stamps and the label data in the label data storage unit 333 respectively in association with the ID of the work machine 100.

The learning unit 314 inputs the time series of the state data by using a combination of the time series of the state data stored in the state data storage unit 331 and the time series of the label data stored in the label data storage unit 333 as training data, and a prediction model is learned to output a time series of work classifications. Examples of the prediction model include a neural network model, a decision tree model, a support vector machine model, and the like. The learning unit 314 stores the learned prediction model in the model storage unit 334.

The work determination unit 315 obtains a likelihood time series related to the work classification based on the time series of new state data acquired by the state data acquisition unit 311 and the prediction model stored in the model storage unit 334. For example, the work determination unit 315 obtains the likelihood time series related to the work classifications by the following procedure. The work determination unit 315 acquires state data at a time point of determination the work from the time series of the state data. Next, the work determination unit 315 acquires a result of determination likelihood of each work classification based on the acquired state data. The work determination unit 315 aggregates the likelihood of the work classification determined at each time point as the time series.

Specifically, the work determination unit 315 obtains a matrix having a classification of a work as a row and a time as a column, and having likelihood of the work related to the classification at that time as an element. That is, a likelihood time series may be a matrix in which a value $w_{ij}$ of an element in an i-th column and a j-th row is set to be the likelihood when a work at the time $t_i$ is a work related to the classification $a_j$. The work determination unit 315 determines a classification of a unit work by the work machine 100 by obtaining a likelihood time series related to the unit works. The work determination unit 315 determines a classification of an element work by the work machine 100 by obtaining a likelihood time series related to the element works. The smoothing unit 316 performs a smoothing process of a likelihood time series for each of the classifications of the works obtained by the work determination unit 315. For example, the smoothing unit 316 applies a time average filter to the likelihood time series so as to smooth the likelihood time series. That is, the smoothing unit 316 determines a representative value per unit time for each of the likelihood time series of the unit works and the likelihood time series of the element works.

At this time, a size of a window function (a length of the unit time) of a time average filter related to the element work is smaller than a size of a window function of a time average filter related to the unit work. The smoothing method is not limited to the time average, but the size of the window function related to the element work is preferably smaller than the size of the window function related to the unit work. This is because a time for one element work to continue is shorter than a time for one unit work to continue, as the unit work is configured with the element work.

The period determination unit 317 determines a start point and an end point of the “excavating and loading” based on the likelihood time series related to the unit works and the likelihood time series related to the element works. For example, the excavating and loading graph generation unit 319 determines an end time of the “waiting for dumping” in a period related to the “excavating and loading” as the start point of the “excavating and loading”. Further, for example, the excavating and loading graph generation unit 319 determines a start time of the “load platform pressing” in a period related to the “excavating and loading” as the end point of the “excavating and loading”.

Further, the period determination unit 317 determines a start point and an end point of the “load swing” based on the likelihood time series related to the element works.

The “excavating and loading” of the unit work is configured with a plurality of loading work. One “excavating and loading” is determined based on, for example, “dumping” or “load platform pressing”. For example, the index-value determination unit 318 determines a swing angle and fuel consumption in a period during which the “load swing” is dominant in the period related to the “excavating and loading”.

Based on the time series of the state data acquired by the state data acquisition unit 311, the index-value determination unit 318 obtains an index value of a state of the work machine 100 related to the “load swing”, for one “excavating and loading” determined by the period determination unit 317. Examples of the index value of the state include a swing angle from an azimuth direction in which the swing body 120 faces at a start of the element work to an azimuth direction in which the swing body 120 faces at an end of the element work, fuel consumption from the start to the end, and the like.

Further, based on the time series of the state data acquired by the state data acquisition unit 311, the index-value determination unit 318 obtains a statistic of index values of the state of the work machine 100 related to the “load swing”, for each determined “excavating and loading” so as to generate a graph representing the index value, for the “excavating and loading” of each transport vehicle.

Examples of statistics of the index values include an average swing angle, average fuel consumption, and the like in the element work.

Figure 5:
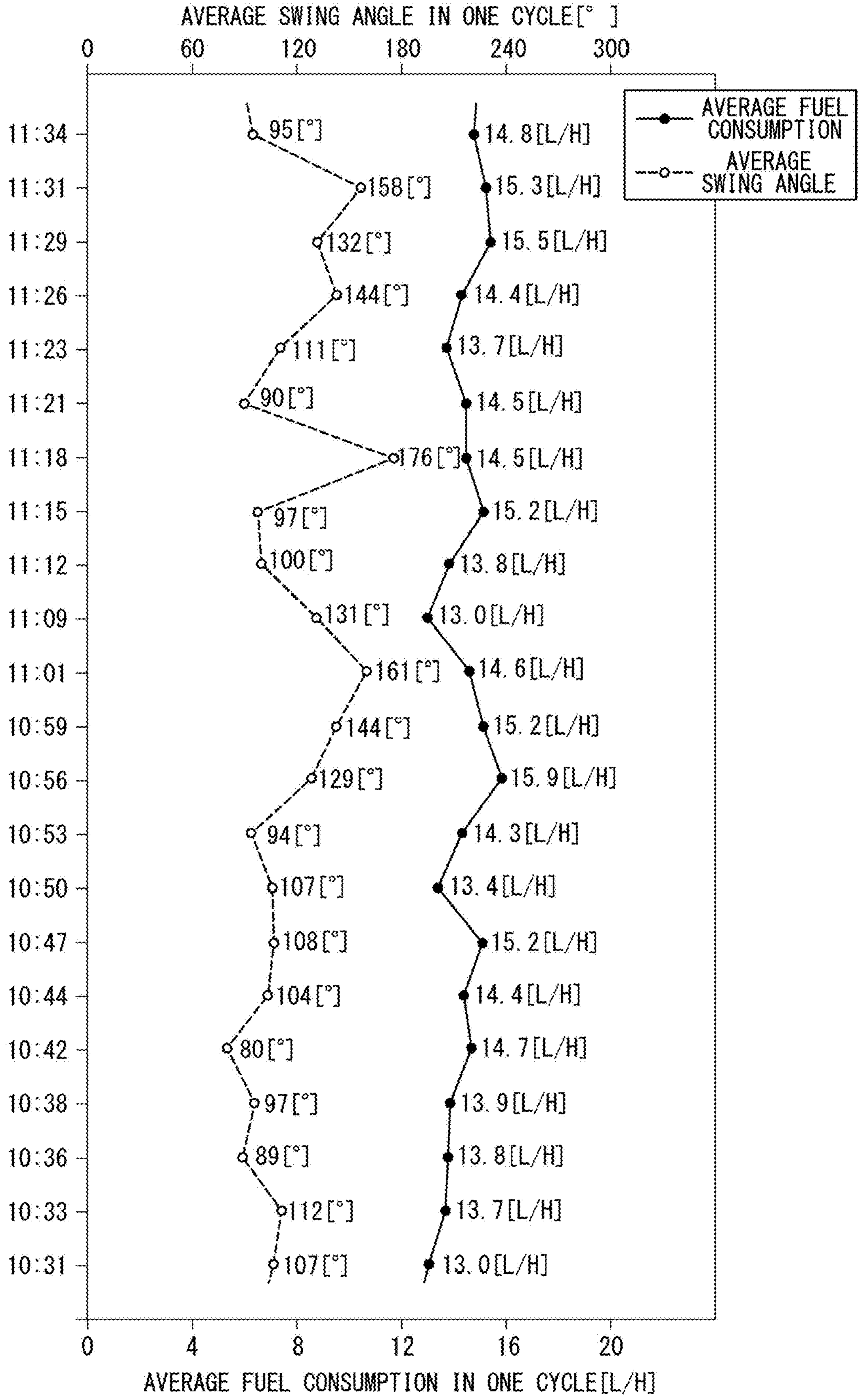
FIG. 5 is a diagram illustrating an example of a graph representing an average swing angle and average fuel consumption for each excavating and loading.

FIG. 5 is a diagram illustrating an example of a graph representing an average swing angle and average fuel consumption for each “excavating and loading”.

Figure 6:
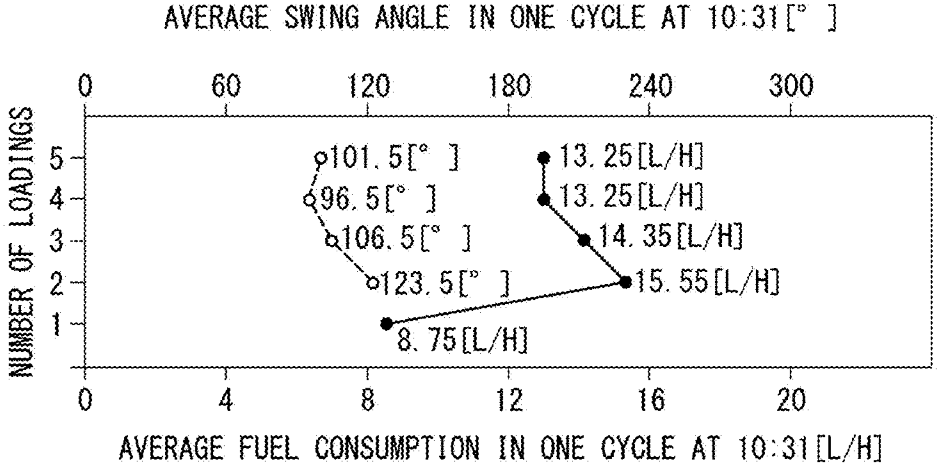
FIG. 6 is a diagram illustrating an example of a graph representing a swing angle and fuel consumption for each loading time related to excavating and loading.

FIG. 6 is a diagram illustrating an example of a graph representing a swing angle and fuel consumption for each loading time related to the “excavating and loading”.

Based on an index value determined by the index-value determination unit 318 and a statistic of the index values, the excavating and loading graph generation unit 319 generates a graph illustrating the statistic of the index values of a state of the work machine 100 for each one cycle of “excavating and loading”. One cycle of the “excavating and loading” includes a work from a start of loading earth and sand into the transport vehicle by the work machine 100 to an end of loading the earth and sand via a plurality of times of “load swing”. For example, the excavating and loading graph generation unit 319 generates a graph illustrating an average swing angle and average fuel consumption for each one cycle of “excavating and loading” as illustrated in FIG. 5. The vertical axis in FIG. 5 represents a completion time of one cycle of “excavating and loading”, and the horizontal axis represents an average swing angle and average fuel consumption.

Further, based on the index value determined by the index-value determination unit 318 and the statistic of the index values, the excavating and loading graph generation unit 319 generates a graph illustrating the index value of the state of the work machine 100 for each loading time in a certain cycle of “excavating and loading”. For example, the excavating and loading graph generation unit 319 generates a graph illustrating a swing angle and fuel consumption for each loading time related to one cycle of “excavating and loading” as illustrated in FIG. 6. The example illustrated in FIG. 6 illustrates an index value of the state of the work machine 100 for each loading time in the “excavating and loading” at 10:31 among a plurality of “excavating and loading”s in FIG. 5. Further, in the example illustrated in FIG. 6, a load capacity of the transport vehicle reaches a maximum load capacity in five times of “load swing” after the start of “excavating and loading”, and the “excavating and loading” is completed. For example, in the example illustrated in FIG. 6, since a swing angle in the second loading is 123.5 degrees, the swing angle in the third loading is 106.5 degrees, the swing angle in the fourth loading is 96.5 degrees, and the swing angle in the fifth loading is 101.5 degrees, an average swing angle is 107.0 degrees. That is, the average swing angle in the “excavating and loading” at 10:31 is 107.0 degrees as illustrated in FIG. 5. In the same manner, in the example illustrated in FIG. 6, since fuel consumption in the first loading is 8.75 L/H, the fuel consumption in the second loading is 15.55 L/H, the fuel consumption in the third loading is 14.35 L/H, the fuel consumption in the fourth loading is 13.25 L/H, and the fuel consumption in the fifth loading is 13.25 L/H, an average fuel consumption is 13.0 L/H. That is, the average fuel consumption in the “excavating and loading” at 10:31 is 13.0 L/H as illustrated in FIG. 5.

The excavating and loading graph generation unit 319 according to the first embodiment generates the graph representing the swing angle and the fuel consumption as a graph representing an index value for each loading time, but the graph is not limited to this, and the graph may represent an index value of any one of the swing angle and the fuel consumption. Further, the excavating and loading graph generation unit 319 may generate a graph representing other index values such as a time related to “excavating and loading”. Further, the excavating and loading graph generation unit 319 may generate a graph by appropriately combining combinations of a plurality of types of index values. The number of combination types is not limited to two, and the excavating and loading graph generation unit 319 may generate a graph in which three or more types are combined.

The output unit 320 outputs a graph representing the index value of the work machine 100 related to the “excavating and loading” generated by the excavating and loading graph generation unit 319. The output by the output unit 320 includes, for example, display on a display, printing on a sheet such as paper by a printer, transmission to an external server connected to the output unit 320 via a network, writing to an external storage medium connected to the interface 37, and the like. Therefore, an analyst or the like can comprehensively analyze work contents at a different location at a time different from the work time.

<<Learning Method>>

The work analysis device 300 generates a prediction model in advance before executing a work analysis on one work machine 100.

Figure 7:
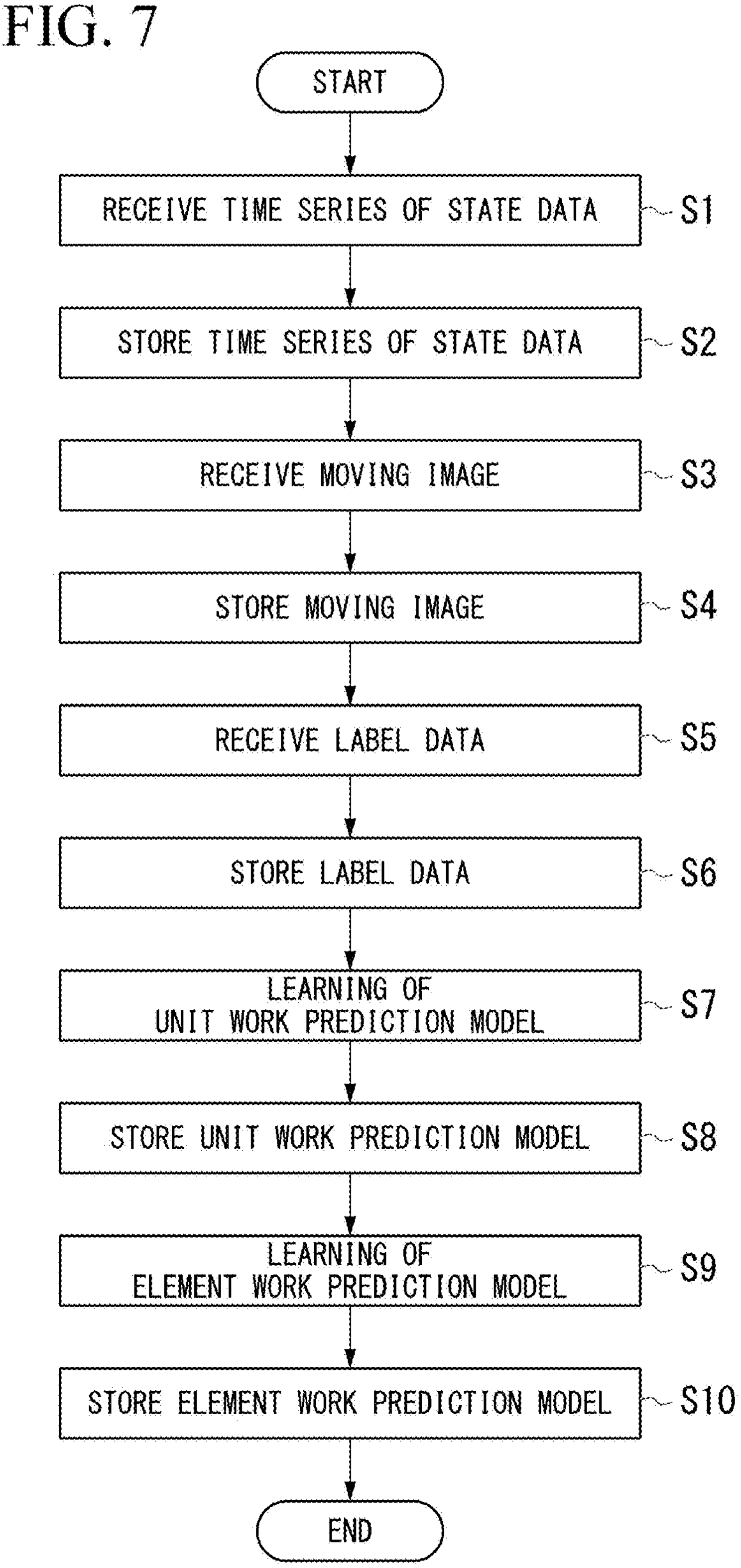
FIG. 7 is a flowchart illustrating a learning process of the work analysis device according to the first embodiment.

FIG. 7 is a flowchart illustrating a learning process of the work analysis device according to the first embodiment.

The state data acquisition unit 311 of the work analysis device 300 receives a time series of state data of the work machine 100 from each of a plurality of work machines 100 (step S1). The state data acquisition unit 311 stores the time series of the received state data in the state data storage unit 331 in association with an ID of the work machine 100 (step S2). Further, the moving image acquisition unit 312 receives a moving image captured by the imaging device 127 of the work machine 100 from each of the plurality of work machines 100 (step S3). The moving image acquisition unit 312 stores the received moving image in the moving image storage unit 332 in association with the ID of the work machine 100 (step S4).

The labeling device 200 acquires the moving image stored in the moving image storage unit 332 and generates label data by an operation of a user. The labeling device 200 transmits the generated label data in association with the ID of the work machine 100, to the work analysis device 300. The labeling device 200 generates label data for unit work and label data for element work for each of a plurality of moving images by the above process.

The label data acquisition unit 313 of the work analysis device 300 receives a plurality of pieces of label data from the labeling device 200 (step S5). The label data acquisition unit 313 stores the plurality of pieces of label data in the label data storage unit 333 in association with the ID of the work machine 100 (step S6).

Next, the learning unit 314 uses a plurality of time series of the state data stored in the state data storage unit 331 and the plurality of pieces of the label data of the unit work stored in the label data storage unit 333 as training data to learn a unit work prediction model (step S7), and the learned unit work prediction model is stored in the model storage unit 334 (step S8). Further, the learning unit 314 uses a plurality of time series of the state data stored in the state data storage unit 331 and the plurality of pieces of the label data of the element work stored in the label data storage unit 333 as training data to learn an element work prediction model (step S9), and the learned element work prediction model is stored in the model storage unit 334 (step S10). In another embodiment, the learning unit 314 may learn only the prediction model related to any one of the unit work and the element work.

At this time, the learning unit 314 learns the prediction model to take the time series of the state data as an input and take the label data (a matrix indicating the time series for each work classification) as an output.

<<Work Analysis Method>>

When the above preparation is completed, the work analysis device 300 can analyze the work of any work machine 100.

Figure 8:
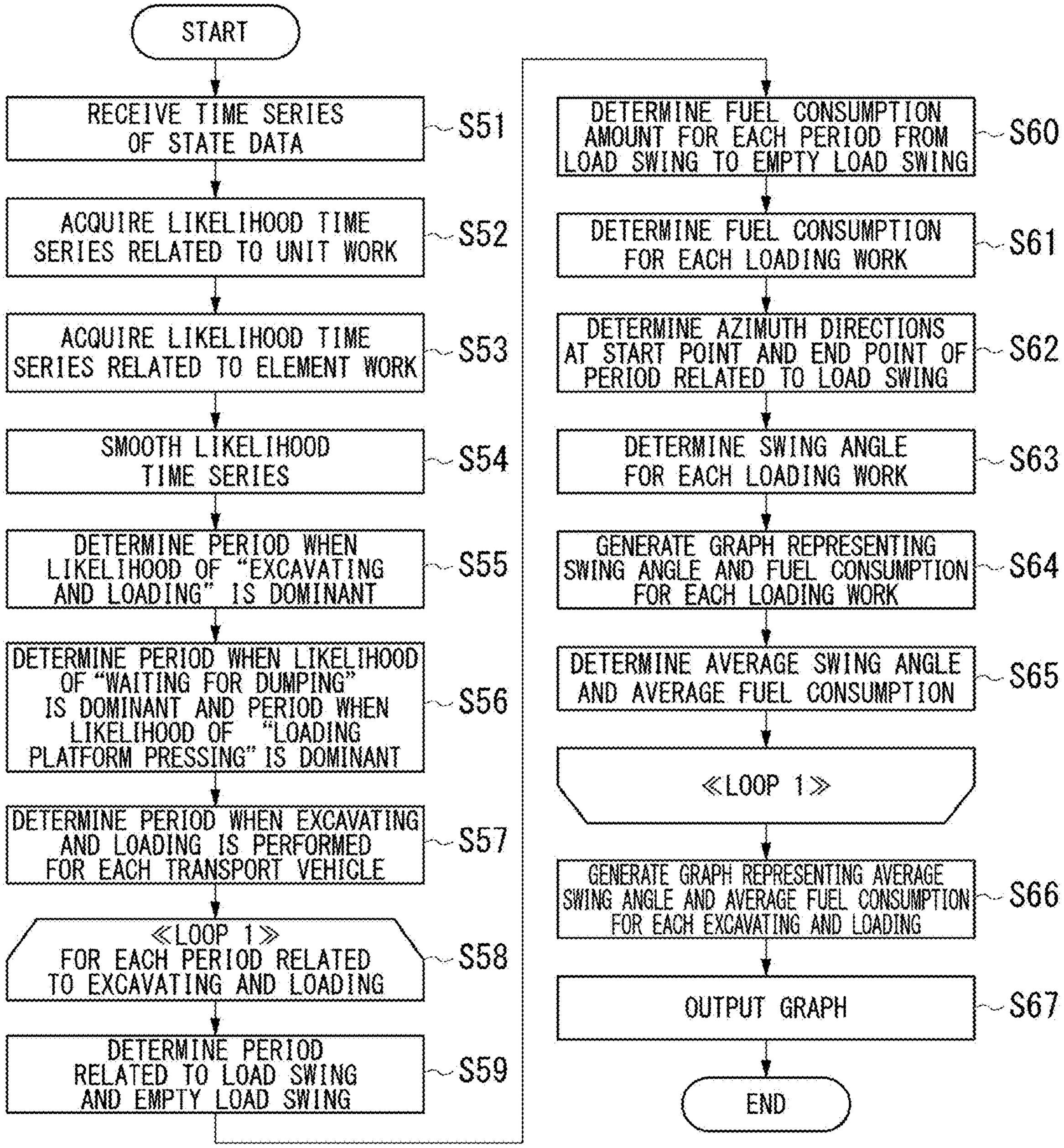
FIG. 8 is a flowchart illustrating a work analysis method by the work analysis device according to the first embodiment.

FIG. 8 is a flowchart illustrating a work analysis method by the work analysis device according to the first embodiment.

The state data acquisition unit 311 of the work analysis device 300 receives a time series of state data from one work machine 100 (step S51). Next, by inputting the time series of the received state data into a unit work prediction model stored in the model storage unit 334, the work determination unit 315 obtains a likelihood time series related to unit works (step S52). Therefore, the work determination unit 315 determines the unit work at each time related to the time series. Further, by inputting the time series of the received state data into an element work prediction model stored in the model storage unit 334, the work determination unit 315 obtains a likelihood time series related to element works (step S53). The smoothing unit 316 respectively applies a time average filter to the likelihood time series related to the unit works and the likelihood time series related to the element works to smooth the likelihood time series (step S54).

Figure 9:
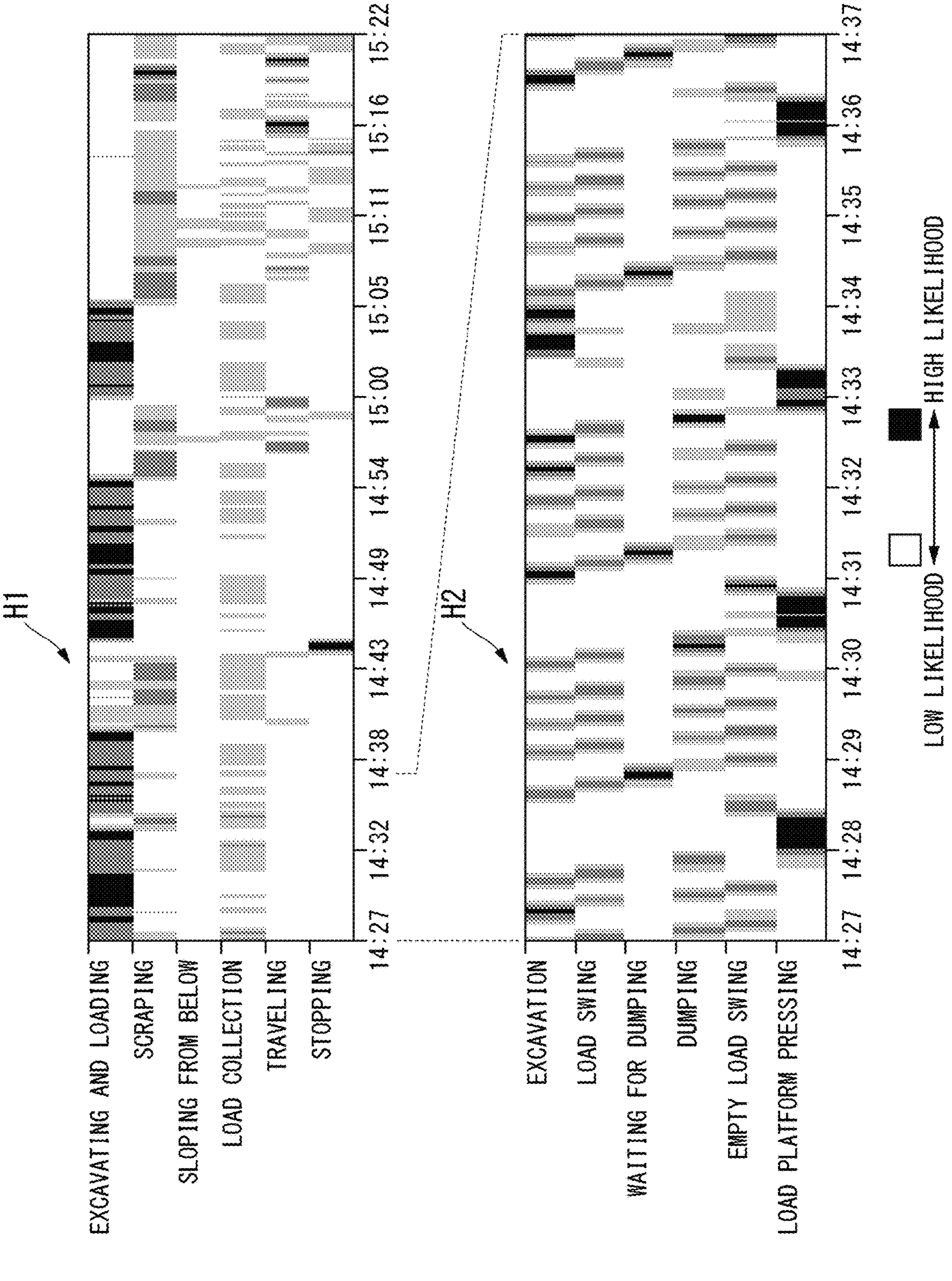
FIG. 9 is a diagram illustrating an example of a heat map representing a likelihood time series related to unit works and a likelihood time series related to element works.

FIG. 9 is a diagram illustrating an example of heat maps representing a likelihood time series related to unit works and a likelihood time series related to element works.

A heat map H1 in FIG. 9 represents the likelihood time series related to the unit works. A heat map H2 in FIG. 9 represents the likelihood time series related to the element works. As illustrated in FIG. 9, according to the likelihood time series related to the unit works and the likelihood time series related to the element works, a work state in which a plurality of unit works or a plurality of element works are performed in combination or a work state in which a classification of a work seamlessly moves to a classification of a different work is represented as a state in which likelihood of a plurality of classifications of works is high at the same time.

Next, based on a smoothed likelihood time series related to the unit works, the period determination unit 317 determines a period during which likelihood of "excavating and loading" is dominant (step S55). Next, the period determination unit 317 determines a plurality of periods during which likelihood of "waiting for dumping" is dominant and a plurality of periods during which likelihood of "load platform pressing" is dominant, in the determined period (step S56). The period determination unit 317 determines a period from an end time of the period during which the likelihood of "waiting for excavation" is dominant to a start time of the period during which the likelihood of "load platform pressing" is dominant as a period during which the "excavating and loading" is performed for each one transport vehicle (step S57). That is, the period determination unit 317 determines the end time of the period during which the likelihood of "waiting for dumping" is dominant as a start point of the period during which the "excavating and loading" is performed for one transport vehicle, and determines the start time of the period during which the likelihood of "load platform pressing" is dominant as an end point of the period during which the "excavating and loading" is performed for one transport vehicle.

The work analysis device 300 selects the determined period related to the "excavating and loading" one by one and executes the processes in steps S59 to S65 in the following for the selected period (step S58).

The period determination unit 317 determines a plurality of periods during which the element work is related to "load swing" and a plurality of periods during which the element work is related to "empty load swing", in the selected period related to the "excavating and loading" (step S59).

The index-value determination unit 318 determines a fuel consumption amount of the engine 122 in each period from the start point of the period related to the "load swing" to the end point of the period related to the "empty load swing", based on the time series of the state data acquired by the state data acquisition unit 311 (step S60). The index-value determination unit 318 determines fuel consumption for each loading work based on the determined fuel consumption amount (step S61).

The index-value determination unit 318 determines an azimuth direction of the swing body 120 at a start point and an end point of each period related to the "load swing", based on the time series of the state data acquired by the state data acquisition unit 311 (step S62). The azimuth direction of the swing body can be obtained, for example, by a difference in positioning information between two GNSS antennas included in the work machine 100 or by measurement with a potentiometer. The index-value determination unit 318 determines a swing angle for each loading work based on a difference between the azimuth direction related to the start point and the azimuth direction related to the end point of each period (step S63).

As illustrated in FIG. 6, the excavating and loading graph generation unit 319 generates a graph representing a change in the fuel consumption and the swing angle for each loading work (step S64).

Further, based on the fuel consumption amount for each loading work determined in step S61 and the swing angle for each loading work determined in step S63, the index-value determination unit 318 determines an average swing angle and average fuel consumption of the "excavating and loading" related to the selected period (step S65).

When the work analysis device 300 executes the processes in steps S59 to S65 for each period related to "excavating and loading", the excavating and loading graph generation unit 319 generates a graph representing a change in the average fuel consumption and the average swing angle for each "excavating and loading" as illustrated in FIG. 5 (step S66). The output unit 320 outputs the graph generated by the excavating and loading graph generation unit 319 in step S64 and step S66 (step S67).

<<Action and Effect>>

In this manner, according to the first embodiment, the work analysis device 300 determines the classification of the work executed by the work machine based on the state data indicating the state of the work machine 100, and determines the index value of the state of the work machine 100 from the start point to the end point of the period related to the predetermined classification. Therefore, a user can use the index value of the state of the determined work machine 100 as evaluation material for evaluating the operator or analyzing the work. The work analysis device 300 according to the first embodiment executes the processes in steps S1 to S10 illustrated in FIG. 7 and the processes in steps S51 to S67 illustrated in FIG. 8, but is not limited thereto. For example, in another embodiment, the processes in steps S1 to S10 and the processes in steps S52 to S56, steps S58 to S59, and steps S64 to S67 may not be executed. Further, the work analysis device 300 may execute the process of any one of S60 and S61 or S62 and S63. Further, the work machine 100 may not include the imaging device 127, the rotation speed sensor 141, the torque sensor 142, the fuel sensor 143, the pilot pressure sensor 144, the boom cylinder head pressure sensor 145, the boom cylinder bottom pressure sensor 146, the boom stroke sensor 147, the arm stroke sensor 148, and the bucket stroke sensor 149.

For example, with reference to the graph illustrated in FIG. 5, it can be seen that a variation in the average swing angles after 10:56 is larger than a variation in the average swing angles before 10:53. From this, in the work of "excavating and loading" until 10:53, it can be read that an incidental work such as "load collection" is performed in advance and a pile of earth and sand to be loaded into the transport vehicle is sufficiently collected at a predetermined position. On the other hand, in the work of "excavating and loading" after 10:56, it can be read that the earth and sand collected by the "load collection" no longer exists by the work of "excavating and loading" until then and the earth and sand to be loaded is excavated and loaded on the spot, so efficiency is decreased. Therefore, a quality of the incidental work by the operator can be evaluated and a necessary incidental work can be examined based on the variation in the average swing angles for each work of loading and excavating.

Further, for example, with reference to the graph illustrated in FIG. 6, it can be seen that the larger the swing angle in one loading work, the worse the fuel consumption. In the graph in FIG. 6, the swing angle in the first loading work is not recorded since the work machine 100 is in a state of "waiting for dumping" at the start point of the "excavating and loading", and the "load swing" is not performed. From this, it can be read that the larger the swing angle of the work machine 100, the worse the fuel efficiency. In a case where the state of the work machine 100 at the start point of the first "excavating and loading" is not "waiting for dumping", the swing angle of the first loading work can also be recorded.

In this manner, the user can perform multilateral analysis by using the index value of the state of the work machine 100 as evaluation material.

Other Embodiments

Although one embodiment is described in detail above with reference to the drawings, a specific configuration is not limited to the above, and various design modifications and the like can be made.

In the above-described embodiment, the work analysis device 300 obtains an index value of a state of the work machine 100 for "excavating and loading" among classifications of unit works and "load swing" among classifications of element works, but is not limited thereto. The work analysis device 300 according to another embodiment may obtain an index value of a state of the work machine 100 for other classifications of the work.

For example, the work analysis device 300 may obtain an index value of a state of the work machine 100 from "excavation" to "dumping" in a work of "ditching". Therefore, the user can evaluate the operator for the work of "ditching" or analyze the work of "ditching".

Further, for example, the work analysis device 300 may obtain a distance related to continuous operations of the work equipment 130 in a work of "rolling compaction" on the slope. The continuous operations of the work equipment 130 mean operations from a state in which at least one of the boom 131, the arm 132, and the bucket 133 is not operated, via a state in which all of the boom 131, the arm 132, and the bucket 133 are operated, to a state at least one of the boom 131, the arm 132, and the bucket 133 is not operated. In the work of "rolling compaction" on the slope, the operator needs to move the bucket 133 along the slope while matching an angle of the bucket 133 with a target angle of the slope. An inexperienced operator moves the bucket 133 little by little and adjusts the angle of the bucket 133 each time, so that the distance related to continuous operation of the work equipment 130 tends to be short. On the other hand, a skilled operator adjusts the boom 131, the arm 132, and the bucket 133 at the same time to move the bucket 133 along the slope while matching the angle of the bucket 133 with the target angle, so that the distance related to continuous operation of the work equipment 130 tends to be long. Therefore, the user can evaluate the work of the sloping of the operator or analyze the work of "ditching".

In the above-described embodiment, the work analysis device 300 obtains an average value of index values as a statistic of the index values, but is not limited thereto. The work analysis device 300 according to another embodiment may obtain other representative values such as a median value, a maximum value, and a minimum value, or may obtain a degree of dispersion such as a range and a standard deviation. The representative value and the degree of dispersion are examples of statistics.

In the above-described embodiment, the data aggregation device 128 of the work machine 100 transmits a measurement value of each sensor to the work analysis device 300, and the work analysis device 300 determines a classification of a work based on the measurement value, but is not limited thereto. For example, in another embodiment, the data aggregation device 128 may determine the classification of the work based on the measurement value of each sensor. For example, in another embodiment, a prediction model generated by the work analysis device 300 may be stored in the data aggregation device 128, and the data aggregation device 128 may determine the classification of the work by using the prediction model. That is, in another embodiment, the work analysis device 300 may be mounted on the data aggregation device 128. In this case, the data aggregation device 128 may display an analysis result of a classification of the current work in real time on a display mounted on the work machine 100. Therefore, the operator can perform the work while recognizing the classification of the work.

The work analysis device 300 according to the above-described embodiment determines a likelihood time series of a classification of each work, but is not limited to this in other embodiments, and a time series of truth values of the classification of each work may be determined. Even in this case, the work analysis device 300 can obtain the likelihood time series of the classification of the work by smoothing the determined time series.

Further, the labeling device 200 according to the above-described embodiment generates label data based on an operation of the user, but is not limited thereto. For example, the labeling device 200 according to another embodiment may automatically generate the label data by an image process or the like.

Further, the work analysis device 300 according to the above-described embodiment determines a classification of the work of the work machine 100 based on the learned prediction model, but is not limited to this. For example, the work analysis device 300 according to another embodiment may determine a classification of the work of the work machine 100 based on a program on which machine learning is not performed. The program on which machine learning is not performed is a program which determines a classification of the work from a combination of operations defined in advance based on an input of state data. For example, the work analysis device 300 may determine a work classification based on states of operations of raising and lowering the boom 131, pushing and pulling the arm 132, excavating and dumping with the bucket 133, swinging the swing body 120 to the right and left, and turning the traveling body 110 forward and backward. Specifically, the work analysis device 300 may determine an element work when the pulling operation of the arm 132 and the excavation operation of the bucket 133 are performed at the same time as "excavation". Further, the work analysis device 300 may determine an element work when the raising operation of the boom 131 and the swing operation of the swing body 120 are performed at the same time as "load swing". Further, the work analysis device 300 may determine an element work when the dumping operation of the bucket 133 is performed after the "load swing" as "dumping". Further, the work analysis system 1 may determine an element work when the lowering operation of the boom 131 and the swing operation of the swing body 120 are performed at the same time as "empty load swing". In this case, the work analysis system 1 may not include the imaging device 127, the labeling device 200, the moving image acquisition unit 312, the label data acquisition unit 313, the learning unit 314, the moving image storage unit 332, and the label data storage unit 333.

Further, the work analysis device 300 according to the above-described embodiment estimates the work classification based on the detection values of the plurality of sensors or the values calculated based on the detection values, but is not limited to this. For example, the work analysis device 300 according to another embodiment may estimate the work classification based on a moving image captured by the imaging device 127. That is, images captured by the imaging device 127 can be examples of state data representing a state of the work machine 100. Further, the work analysis device 300 according to the above-described embodiment determines the start point and the end point of the unit work based on the likelihood time series related to the unit works and the likelihood time series related to the element works, but is not limited thereto. For example, the work analysis device 300 according to another embodiment may determine the start point and the end point of the unit work based on the moving image captured by the imaging device 127.

Further, the data aggregation device 128 according to the above-described embodiment stores the state data in the storage unit in association with the time stamps, and transmits the state data to the work analysis device 300 as a time series, but is not limited to this. For example, the data aggregation device 128 according to another embodiment may transmit the collected state data to the work analysis device 300 in association with sequential time stamps. In this case, the work analysis device 300 sequentially acquires combinations of the state data and the time stamp and aggregates the state data and the time stamps as a time series.

INDUSTRIAL APPLICABILITY

According to the present invention, an index-value determination device can generate evaluation material which can be used for evaluating an operator or analyzing a work.

REFERENCE SIGNS LIST

1 Work analysis system
100 Work machine
200 Labeling device
300 Work analysis device
110 Traveling body
120 Swing body
130 Work equipment
111 Continuous track
112 Traveling motor
131 Boom
132 Arm
133 Bucket
134 Boom cylinder
135 Arm cylinder
136 Bucket cylinder
P1 Boom pin
P2 Arm pin
P3 Bucket pin
121 Cab
122 Engine
123 Hydraulic pump
124 Control valve
125 Swing motor
126 Operation device
127 Imaging device
128 Data aggregation device
141 Rotation speed sensor
142 Torque sensor
143 Fuel sensor
144 Pilot pressure sensor
145 Boom cylinder head pressure sensor
146 Boom cylinder bottom pressure sensor
147 Boom stroke sensor
148 Arm stroke sensor
149 Bucket stroke sensor
21 Processor
22 Main memory
23 Storage
24 Interface
211 Moving image acquisition unit
212 Moving image display unit
213 Label input unit
214 Label data generation unit
215 Label data transmission unit
31 Processor
33 Main memory
35 Storage
37 Interface
311 State data acquisition unit
312 Moving image acquisition unit
313 Label data acquisition unit
314 Learning unit
315 Work determination unit
316 Smoothing unit
317 Period determination unit
318 Index-value determination unit
319 Excavating and loading graph generation unit
320 Output unit
331 State data storage unit
332 Moving image storage unit
333 Label data storage unit
334 Model storage unit

The invention claimed is:

1. An index-value determination device comprising:
a work machine;
a state data acquisition processor unit that acquires state data indicating a state of the work machine at a plurality of times;

a work determination processor unit that determines a classification of a work of the work machine for each of the plurality of times based on the acquired state data;

a period determination processor unit that determines a start point and an end point of a period related to a predetermined classification among determined classifications of works; and an index-value determination processor unit that obtains an index value of the state of the work machine, the index value of the state of the work machine including at least a swing angle of the work machine from the start point to the end point, wherein the work determination processor unit acquires a likelihood of each classification of the work of the work machine based on the acquired state data, and determines the classification of the work of the work machine for each of the plurality of times based on the likelihood of each classification of the work, the index-value determination device further comprises a smoothing processor unit which performs a smoothing process of the likelihood of each classification of the work acquired by the work determination processor unit, and the period determination processor unit determines the start point and the end point of the period related to the predetermined classification among the determined classifications of the works based on the likelihood in which the smoothing process is performed.

2. The index-value determination device according to claim 1, wherein the work determination processor unit determines a classification of an element work indicating a series of operations or works classified by purpose, and the period determination processor unit determines the start point and the end point of a period related to the classification of the element work.

3. The index-value determination device according to claim 2, wherein the work determination processor unit further determines a classification of a unit work indicating a work for performing one work purpose of the work machine, the period determination processor unit determines the start point and the end point of a period related to a classification of a predetermined element work constituting a predetermined unit work, and the index-value determination processor unit obtains the index value from the start point to the end point of the period.

4. The index-value determination device according to claim 2, wherein the period determination processor unit determines the start point and the end point of a period related to load swing or empty load swing of the work machine, and the index-value determination processor unit obtains the swing angle of the work machine in the load swing or the empty load swing.

5. The index-value determination device according to claim 2, further comprising:

an output processor unit that outputs index values determined by the index-value determination processor unit, wherein the period determination processor unit determines start points and end points of a plurality of periods related to classifications of predetermined element works, the index-value determination processor unit obtains the index values from the start points to the end points of the plurality of periods, and the output processor unit outputs a graph illustrating transitions of the index values for the plurality of periods.

6. The index-value determination device according to claim 3, wherein the period determination processor unit determines start points and end points of a plurality of periods related to the classifications of the element works, and the index-value determination processor unit obtains a statistic of index values based on index values from the start points to the end points of the plurality of periods.

7. The index-value determination device according to claim 3, wherein the index-value determination processor unit obtains different types of the index values related to the period.

8. The index-value determination device according to claim 3, wherein the period determination processor unit determines the start point and the end point of a period related to load swing or empty load swing of the work machine, and the index-value determination processor unit obtains the swing angle of the work machine in the load swing or the empty load swing.

9. The index-value determination device according to claim 3, further comprising:

an output processor unit that outputs index values determined by the index-value determination processor unit, wherein the period determination processor unit determines start points and end points of a plurality of periods related to classifications of predetermined element works, the index-value determination processor unit obtains the index values from the start points to the end points of the plurality of periods, and the output processor unit outputs a graph illustrating transitions of the index values for the plurality of periods.

10. The index-value determination device according to claim 4, further comprising:

an output processor unit that outputs index values determined by the index-value determination processor unit, wherein the period determination processor unit determines start points and end points of a plurality of periods related to classifications of predetermined element works, the index-value determination processor unit obtains the index values from the start points to the end points of the plurality of periods, and the output processor unit outputs a graph illustrating transitions of the index values for the plurality of periods.

11. The index-value determination device according to claim 6, wherein the index-value determination processor unit obtains different types of the index values related to the period.

12. The index-value determination device according to claim 6, wherein the period determination processor unit determines the start point and the end point of a period related to load swing or empty load swing of the work machine, and the index-value determination processor unit obtains the swing angle of the work machine in the load swing or the empty load swing.

13. The index-value determination device according to claim 6, further comprising:

an output processor unit that outputs index values determined by the index-value determination processor unit, wherein the period determination processor unit determines start points and end points of a plurality of periods related to classifications of predetermined element works, the index-value determination processor unit obtains the index values from the start points to the end points of the plurality of periods, and the output processor unit outputs a graph illustrating transitions of the index values for the plurality of periods.

14. The index-value determination device according to claim 7, wherein the period determination processor unit determines the start point and the end point of a period related to load swing or empty load swing of the work machine, and the index-value determination processor unit obtains the swing angle of the work machine in the load swing or the empty load swing.

15. The index-value determination device according to claim 7, further comprising:

an output processor unit that outputs index values determined by the index-value determination processor unit, wherein the period determination processor unit determines start points and end points of a plurality of periods related to classifications of predetermined element works, the index-value determination processor unit obtains the index values from the start points to the end points of the plurality of periods, and the output processor unit outputs a graph illustrating transitions of the index values for the plurality of periods.

16. The index-value determination device according to claim 8, further comprising:

an output processor unit that outputs index values determined by the index-value determination processor unit, wherein the period determination processor unit determines start points and end points of a plurality of periods related to classifications of predetermined element works, the index-value determination processor unit obtains the index values from the start points to the end points of the plurality of periods, and the output processor unit outputs a graph illustrating transitions of the index values for the plurality of periods.

17. The index-value determination device according to claim 1, further comprising:

an output processor unit that outputs index values determined by the index-value determination processor unit, wherein the period determination processor unit determines start points and end points of a plurality of periods related to classifications of predetermined element works, the index-value determination processor unit obtains the index values from the start points to the end points of the plurality of periods, and the output processor unit outputs a graph illustrating transitions of the index values for the plurality of periods.

18. The index-value determination device according to claim 17, wherein the output processor unit outputs a graph illustrating transitions of different types of the index values for each of the plurality of periods.

19. The index-value determination device according to claim 1, wherein the index value of the state of the work machine obtained by the index-value determination processor unit also includes a fuel consumption of the work vehicle from the start point to the end point.

20. An index-value determination method comprising:

providing a work machine;

acquiring state data indicating a state of the work machine at a plurality of times;

determination a classification of work of the work machine for each of the plurality of times based on the acquired state data;

determination a start point and an end point of a period related to a predetermined classification among determined classifications of works; and obtaining an index value of the state of the work machine, the index value of the state of the work machine including at least a swing angle of the work machine in the period, wherein, in the step of determination classification of the work of the work machine, a likelihood of each classification of the work of the work machine is acquired based on the acquired state data, and the classification of the work of the work machine for each of the plurality of times is determined based on the likelihood of each classification of the work, the index-value determination method further comprises a step of performing smoothing process of the likelihood of each classification of the work of the work machine acquired in the step of determination classification of the work of the work machine, and in the step of determination the start point and the end point of the period related to the predetermined classification, the start point and the end point of the period related to the predetermined classification is determined based on the likelihood in which the smoothing process is performed.

21. The index-value determination method according to claim 20, wherein the index value of the state of the work machine also includes a fuel consumption of the work vehicle in the period.

* * * * *